(12) United States Patent
Abe

(10) Patent No.: US 6,902,189 B2
(45) Date of Patent: Jun. 7, 2005

(54) FOLDED AIRBAG

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/902,840

(22) Filed: Aug. 2, 2004

(65) Prior Publication Data

US 2005/0001409 A1 Jan. 6, 2005

Related U.S. Application Data

(63) Continuation of application No. 10/170,206, filed on Jun. 13, 2002, now Pat. No. 6,830,266.

(30) Foreign Application Priority Data

Jun. 14, 2001 (JP) ........................ 2001-180355

(51) Int. Cl.⁷ .............................. B60R 21/16
(52) U.S. Cl. .................. 280/743.1; 280/728.1
(58) Field of Search .......................... 280/743.1, 728.1; B60R 21/16

(56) References Cited

U.S. PATENT DOCUMENTS 4,235,453 A * 11/1980 Lawson et al. .......... 280/743.1
4,351,544 A * 9/1982 Ross ........................ 280/743.1
5,615,915 A * 4/1997 Magoteaux ............... 280/743.1
5,899,495 A * 5/1999 Yamamoto et al. ...... 280/743.1
5,979,937 A * 11/1999 Yoshida et al. .......... 280/743.2

FOREIGN PATENT DOCUMENTS

JP         6-87392 A    *  3/1994

* cited by examiner

Primary Examiner—Ruth Ilan
(74) Attorney, Agent, or Firm—Manabu Kanesaka

(57) ABSTRACT

A folded airbag for an airbag device in a vehicle includes a front side, a rear side with an opening for receiving the gas, and a peripheral edge in a flat state where the front side is disposed over the rear side. The folded airbag includes a plurality of folded portions having at least three first folded portions where at least three peripheral portions in the flat state are disposed between the front and rear sides to thereby temporarily form at least three first pointed portions around the peripheral edge, and at least three second folded portions where the at least three first pointed portions are located between the front and rear sides to thereby form second pointed portions. The plurality of folded portions is pushed outwardly between the front and rear sides of the airbag upon inflation of the airbag.

5 Claims, 5 Drawing Sheets

FOLDED AIRBAG

CROSS-REFERENCE TO RELATED APPLICATION

This is a continuation application of Ser. No. 10/170,206 filed on Jun. 13, 2002 now U.S. Pat. No. 6,830,266.

BACKGROUND OF THE INVENTION AND RELATED ART STATEMENT

The present invention relates to a folded airbag disposed in a high speed moving body, such as an automobile, and the like, for protecting a passenger in case of collision, and the like.

An automobile is equipped with various types of air bag devices for a driver's seat, a passenger's seat, a back seat and passengers' legs. The airbag device includes a folded airbag, a case in which the folded airbag or airbag folded member is accommodated, and a gas generator for inflating the folded airbag.

A conventional airbag folded member is arranged by folding a flatly deployed airbag to a front or a rear side thereof. When the airbag folded member is inflated, the gas expelled from the gas generator must reaches an outer peripheral side of the airbag positioned across the folded lines by passing the folded lines.

An object of the present invention is to provide a folded airbag which can be inflated promptly even if a gas generator generates low-pressure gas.

Another object of the present invention is to provide a folded airbag which is deployed promptly in sideward directions (up, down, right, and left directions relative to a passenger).

Further objects and advantages of the invention will be apparent from the following description of the invention

SUMMARY OF THE INVENTION

An airbag device includes a folded airbag, a case for accommodating the airbag, and a gas generator for inflating the airbag. The airbag device has a front surface facing a passenger and a rear surface opposite to the front surface. The air bag is folded to have a first-processed folded member, which is again folded to have a second-processed folded member. In the first-processed folded member, a peripheral edge of the airbag is folded or disposed inwardly at a plurality of portions from a flatly deployed state such that the front surface overlaps the rear surface. The second-processed folded member is arranged by folding a peripheral edge of the first-processed folded member to be located inwardly at a plurality of portions.

A size of the airbag device arranged as described above is reduced to a predetermined size only by folding the outer periphery of the airbag folded member inwardly.

When gas is supplied to the airbag folded member from the gas generator, the inwardly folded portions are inflated by the pressure of the gas in an outward direction opposite to the folded direction thereof (side of the airbag) so as to be pushed outward. Further, when the airbag is inflated, the gas simply pushes the folded portions of the airbag and need not to pass through folded lines as required in conventional art. Thus, the folded portions can be promptly pushed and deployed laterally and outwardly even if the gas pressure is low. Accordingly, the airbag is deployed in the sideward directions promptly even if the gas pressure from the gas generator is low.

DETAILED DESCRIPTION OF PREFERRED EMBODIMENTS

Figure 1:
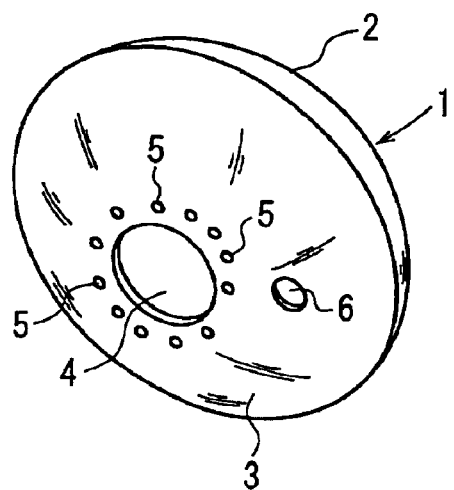
FIG. 1 is a rear perspective view showing an inflated state of an airbag of an airbag device.
Figure 2A:
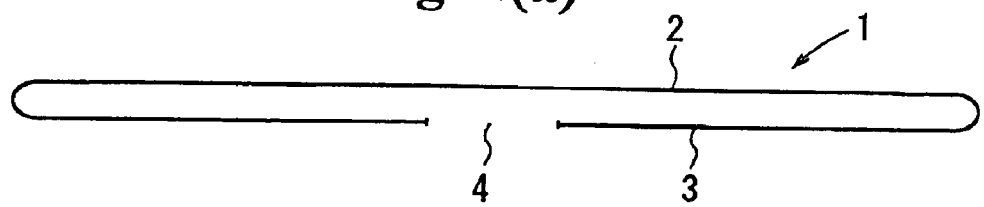
FIG. 2(a) is a sectional view taken along line 2a—2a in FIG. 3(a)
Figure 2B:
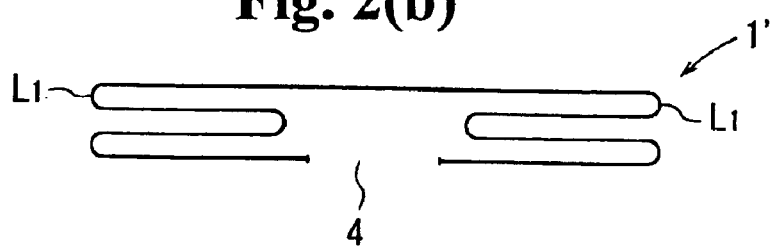
FIG. 2(b) is a sectional view taken along line 2b—2b in FIG. 3(b)
Figure 3A:
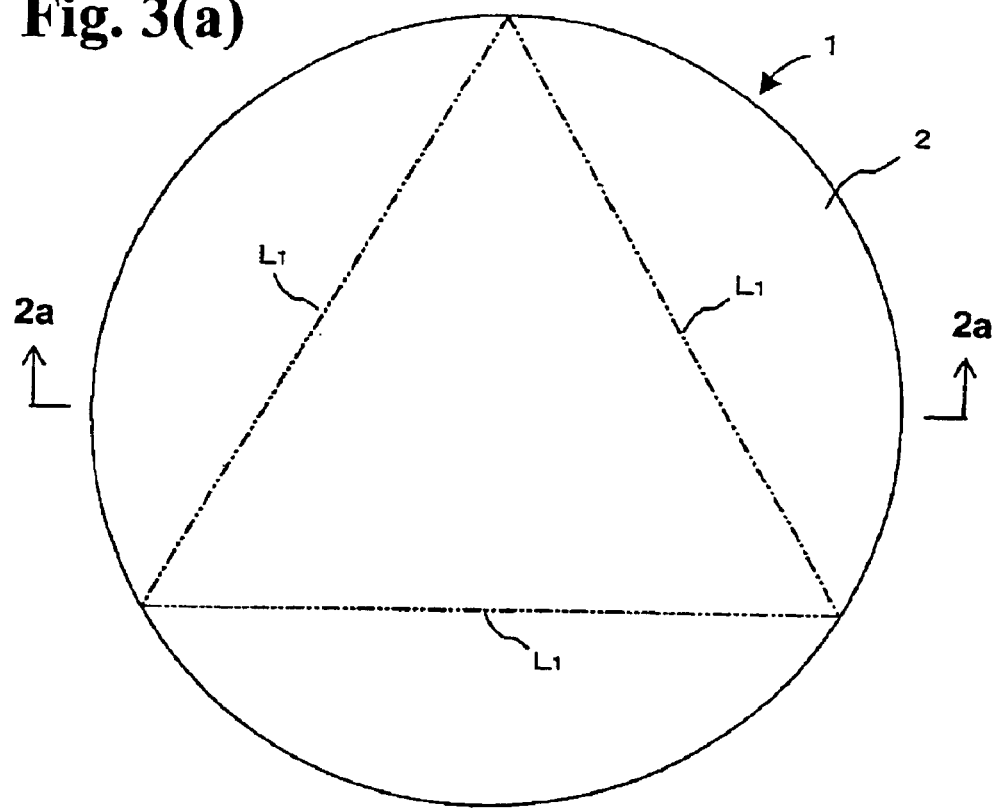
FIG. 3(a) is a plan view showing a flatly deployed state of the airbag.
Figure 3B:
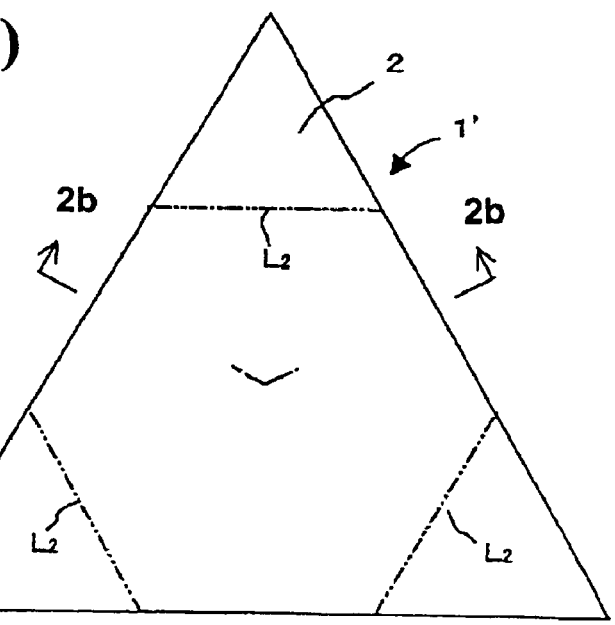
FIG. 3(b) is a plan view showing a first-processed folded member of the airbag.
Figure 4:
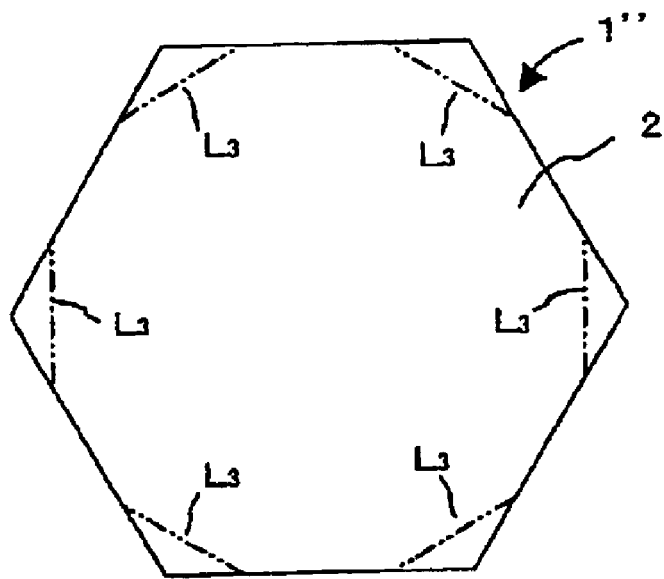
FIG. 4 is a plan view showing a second-processed folded member of the airbag.
Figure 5:
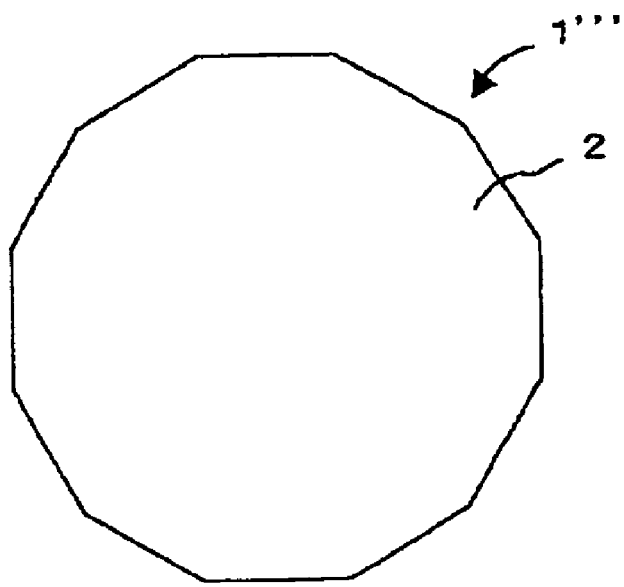
FIG. 5 is a plan view showing a third-processed folded member of the airbag.

Hereunder, embodiments of the invention will be explained with reference to the accompanied drawings. FIG. 1 is a rear perspective view showing an inflated state of an airbag of a driver's seat airbag device according to an embodiment. FIG. 2(a) is a sectional view taken along line 2a—2a in FIG. 3(a), and FIG. 2(b) is a sectional view taken along line 2b—2b in FIG. 3(b). FIG. 3(a) is a plan view showing a flatly deployed state of the airbag, and FIG. 3(b) is a plan view showing a first-processed folded member of the airbag. FIG. 4 is a plan view showing a second-processed folded member of the airbag, and FIG. 5 is a plan view showing a third-processed folded member of the airbag.

The airbag 1 is composed of a circular front panel 2 and a circular rear panel 3. Peripheral edge portions of the front panel 2 and the rear panel 3 are connected with each other by sewing, and the like. The rear panel 3 has an opening 4 defined at the center thereof into which a gas generator (inflator) is inserted. Further, insertion holes 5 for inserting bolts, rivets, and the like to attach the airbag 1 to a retainer are formed around the opening 4 of the rear panel 3. Further, a vent hole 6 is defined through the rear panel 3.

When the airbag is folded, first, triangle portions outside of lines L1 shown in FIG. 3(a) are folded to be disposed into the airbag 1, thereby forming a first-processed triangular folded member 1'. Next, portions near three apexes of the first-processed triangular folded member 1', that is, portions outside of the three lines L2 in FIG. 3(b) are folded inwardly to be disposed inside the first-processed folded member 1', thereby forming a second-processed hexagonal folded member 1". Note that intersecting points of the three sides of the first-processed folded member 1' and the respective lines L2 are located at trisected points of the three sides of the first-processed folded member 1'.

Next, portions near six apexes of the second-processed hexagonal folded member 1", that is, the portions outside of six lines L3 in FIG. 4 are folded inwardly to be disposed into the second-processed folded member 1", thereby forming a third-processed dodecagonal folded member 1'". The third-processed folded member 1'" is attached to the retainer together with the gas generator (inflator) and covered with a module cover. The module cover is attached to the retainer to thereby arrange the airbag device. Note that in case that the third-processed folded member 1'" of FIG. 5 is too large to be assembled in the airbag device, a fourth-processed folded member is formed by further folding outer edges of the third-processed folded member 1'" inwardly, and further a fifth- and more-processed folded members may be arranged, if necessary, in order to obtain a size suitable for assembling the airbag device.

In the airbag device having the airbag arranged as described above, when the gas generator ejects the gas, the airbag folded member is inflated by the gas pressure in such a manner that the folded portions are pushed outwardly. When the airbag folded member is inflated, the folded portions start to inflate by being pushed out as if gas pressure moves a piston. Unlike in a conventional airbag folded member, the gas does not flow beyond the folded lines by passing them. Since the airbag of the present invention is inflated while the gas pressure pushes the folded portions, the airbag is inflated smoothly, thereby thoroughly promptly even if the gas has a low pressure.

Moreover, the airbag is inflated and deployed in lateral or sideward directions promptly (up, down, right and left directions relative to the passenger), and a deployment toward the passenger is restricted due to the folding structure described above. That is, the airbag is deployed such that an area facing the passenger is increased at an early time after the collision of a vehicle is detected. Note that when the gas pressure generated by the gas generator is low, strength required for the front panel 2 and the rear panel 3 can be reduced. Also, the front panel 2 can be coupled with the rear panel 3 with low coupling strength. Further, an inflating speed of the airbag toward the passenger is also reduced.

Figure 6A:
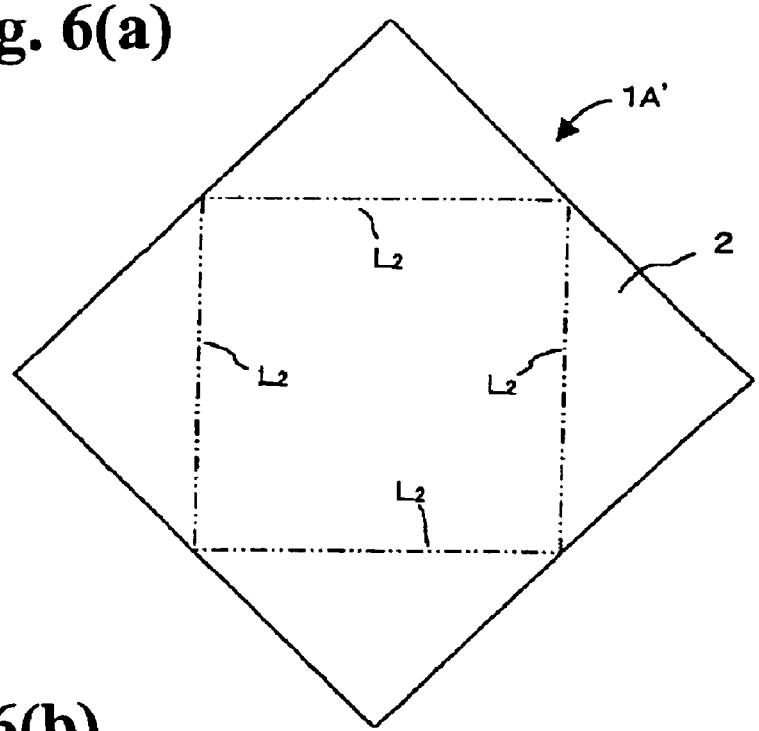
FIGS. 6(a)–6(c) are folding sequence views.
Figure 6B:
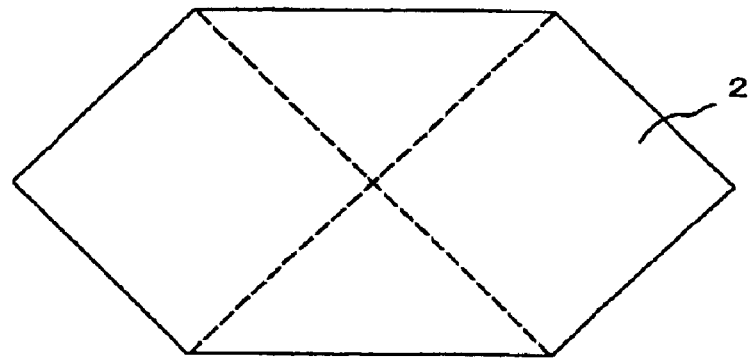
Figure 6C:
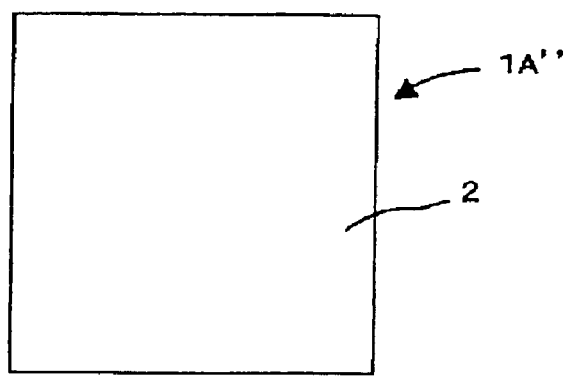

FIGS. 6(a)–6(c) are plan views showing a sequence of folding an airbag according to another embodiment of the present invention. In FIGS. 6(a)–6(c), a peripheral edge of the airbag 1 in the flatly deployed state shown in FIG. 2(a) and FIG. 3(a) is folded inwardly to be disposed inside the airbag from four directions, thereby forming a first-processed square folded member 1A'. Triangular portions outside of the four lines L2 constituting the inscribed quadrangle of the first-processed folded member 1A' are folded inwardly to be disposed inside the airbag therein, thereby forming a second-processed square folded member 1A". An airbag device is arranged by attaching the second-processed folded member 1A", or a third- or more-processed folded members, which are formed by folding the peripheral edge of the second-processed folded member 1A" to make a smaller quadrangle, to a retainer.

Note that FIG. 6(b) shows a mid-step of folding in which the portions outside of two parallel lines L2 are folded inwardly in the first-processed folded member. Intersecting points of the lines L2 and four sides of the first-processed folded member 1A' are located at middle points of the four sides.

Figure 7A:
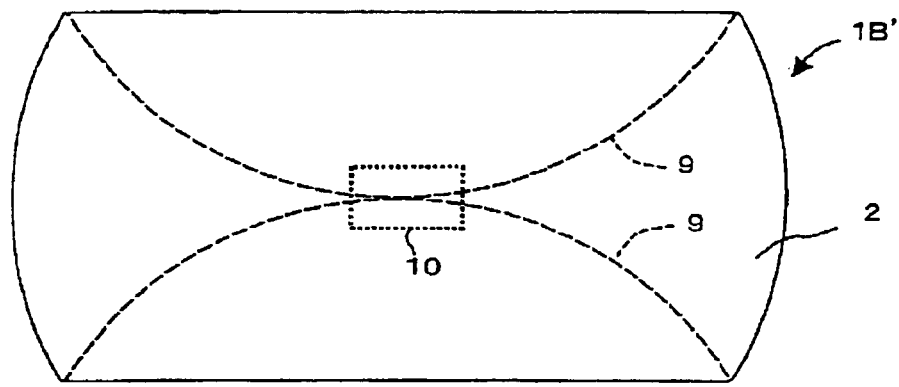
FIGS. 7(a)–7(c) are another folding sequence views.
Figure 7B:
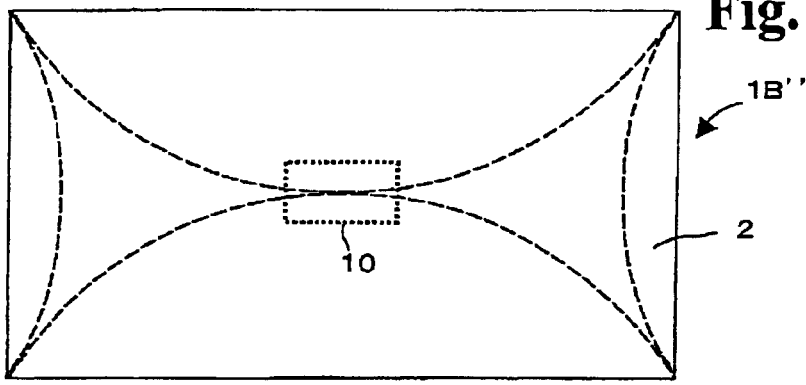
Figure 7C:
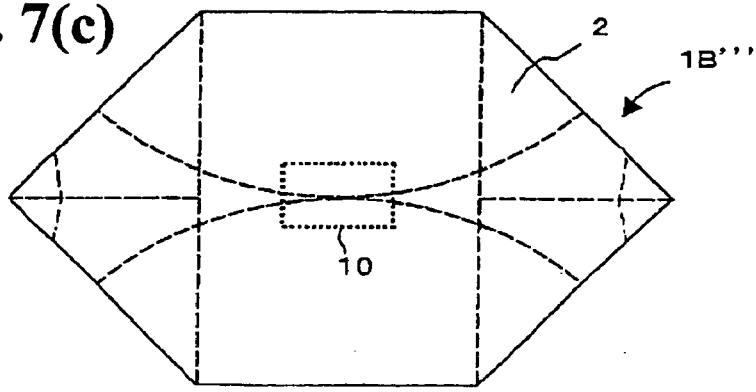

FIGS. 7(a)–7(c) are plan views showing a folding sequence for folding an airbag according to still another embodiment. In FIGS. 7(a)–7(c), a first-processed folded member 1B' is formed by folding the two confronting portions of the airbag 1 in the flatly deployed state shown in FIG. 2(a) and FIG. 3(a) so as to be located inwardly. Then, the folded portions 9 are sewed to the airbag 1 through a tear seam 10. The tear seam 10 has such strength that it can be broken when the airbag is inflated and is used for temporal stitching.

Accordingly, the first-processed folded member 1B' is formed in a drum shape having two straight side portions and two arc-shaped side portions. The two arc-shaped side portions of the first-processed folded member 1B' is folded inwardly to be located inside the airbag, thereby forming a second-processed rectangular folded member 1B". Four corners of the second-processed folded member 1B" are folded inwardly to be disposed therein, thereby forming a third-processed folded member 1B'". A fourth- or more-processed folded member may be formed by further folding corners of the third-processed folded member 1B'" inwardly, if necessary.

An airbag device is formed by attaching the airbag folded as described above to a retainer.

The airbags formed of the folded members according to the sequences in FIGS. 5, 6(a)–6(c), and 7(a)–7(c) are also inflated promptly so that they have a large area facing the passenger when the gas is ejected from the gas generator. Further, the inflation is made thoroughly and promptly even if the gas pressure of the gas generator is low.

Note that when the airbag folded with the sequence in FIGS. 7(a)–7(c) is inflated, the tear seam 10 is broken after it is first inflated in a rectangular shape as shown in FIG. 7(a), then the airbag is deployed vertically. Accordingly, it is possible, for example, to deploy a driver's seat airbag first in a horizontal direction relative to the occupant, and then deploy the airbag in a vertical direction relative to the occupant.

Although not shown, the present invention can be applied to various types of air bags used in a passenger's seat and a back seat or a bag for protecting passengers'legs.

As described above, according to the airbag device of the present invention, it is possible to inflate the airbag thoroughly and promptly to have a large area facing the passenger even if the gas generator has a low gas pressure.

While the invention has been explained with reference to the specific embodiments of the invention, the explanation is illustrative and the invention is limited only to the appended claims.

What is claimed is:

1. A folded airbag for an airbag device in a vehicle, comprising:

a front side, a rear side with an opening for receiving the gas, and a peripheral edge in a flat state where the front side is disposed over the rear side, and a plurality of folded portions including at least three first folded portions where at least three peripheral portions in the flat state are disposed between the front and rear sides to thereby temporarily form at least three first pointed portions around the peripheral edge, and at least three second folded portions where the at least three first pointed portions are located between the front and rear sides to thereby form second pointed portions, one second pointed portion being located at a portion where two adjacent first pointed portions are linked so that the plurality of folded portions is pushed outwardly between the front and rear sides of the airbag upon inflation of the airbag.

2. A folded airbag according to claim 1, wherein six second pointed portions are formed by the at least three second folded portions.

3. A folded airbag according to claim 2, wherein said plurality of folded portions further includes at least six third folded portions where the six second pointed portions are located between the front and rear sides to form the airbag in a predetermined size.

4. A folded airbag according to claim 1, further comprising temporary joint means for joining at least parts of the folded airbag so that the temporary joint means is broken when the folded airbag is inflated.

5. A folded airbag according to claim 1, wherein said folded airbag is compacted by the plurality of folded portions all located between the front and rear sides without further rolling or bending the folded airbag.

* * * * *